J. George,
Brick Machine.

N°46,845. Patented Mar.14, 1865.

Witnesses:
Wm Freeman
Theo Tusch

Inventor:
John George
per Munn & Co
attorneys

UNITED STATES PATENT OFFICE.

JOHN GEORGE, OF JACKSON, MICHIGAN, ASSIGNOR TO HIMSELF AND HENRY HAGUE, OF SAME PLACE.

IMPROVED BRICK-MACHINE.

Specification forming part of Letters Patent No. 46,845, dated March 14, 1865.

*To all whom it may concern:*

Be it known that I, JOHN GEORGE, of Jackson, in the county of Jackson and State of Michigan, have invented a new and Improved Brick-Machine; and I do hereby declare that the following is a full, clear, and exact description thereof, which will enable those skilled in the art to make and use the same, reference being had to the accompanying drawings, forming part of this specification, in which—

Figure 3:
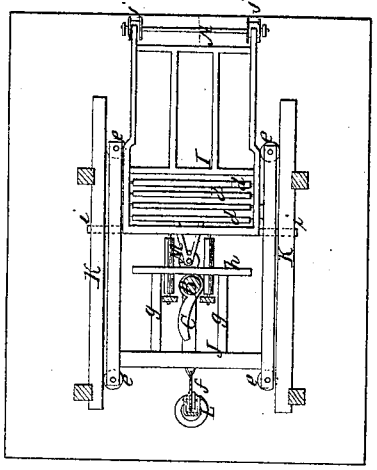
Figure 2:
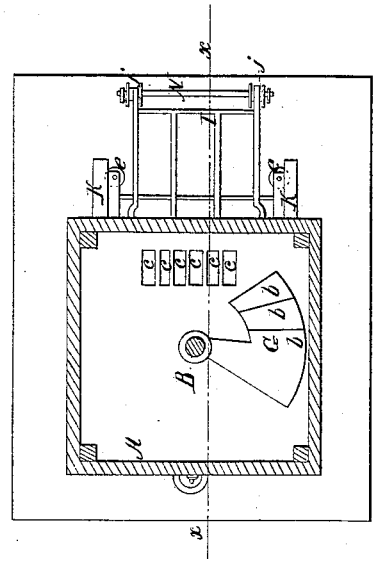
Figure 1:
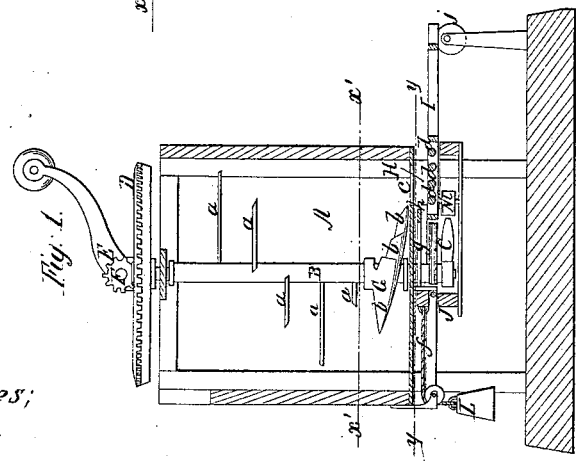

Figure 1 is a vertical section of my invention, taken in the line $x\,x$, Fig. 2; Fig. 2, a horizontal section of the same, taken in the line $x'\,x'$, Fig. 1; Fig. 3, a horizontal section of the same, taken in the line $y\,y$, Fig. 1.

Similar letters of reference indicate corresponding parts.

This invention relates to a new and improved machine for pressing and molding brick, and of that class in which the clay is pressed directly into the mold from the mud-mill and a reciprocating mold-carriage employed.

The invention consists, first, in the employment or use of an elastic pressure arm or blade attached to the lower part of the rotary shaft in the mud-mill and arranged in such a manner that it will yield or give to hard foreign substances in the mud-mill—such as stones, sticks, &c.—and be prevented from being injured or broken.

The invention consists, second, in a novel manner of operating the molds, or shoving the same from the place to be filled, as hereinafter fully shown and described, whereby abundant time is allowed for the insertion of the molds, and the operator or attendant enabled to feed the molds to the press as rapidly as the latter can fill the molds.

A represents an upright box, in which a vertical shaft, B, is fitted centrally and allowed to rotate freely, said shaft extending down a short distance below the bottom of the box A, and having a curved arm or cam, C, upon it, the form of which is shown clearly in Fig. 3. On the upper end of the shaft B there is secured a tooth-wheel, D, into which a pinion, E, on a shaft, F, gears, the latter being the driving-shaft. The shaft B has a series of horizontal arms or blades, $a$, attached to it, (shown in Fig. 1,) and on the lower part of said shaft there is keyed a blade or arm, G, which is composed of three or more leaves, $b$, overlapping each other, so as to render said blade or arm elastic. The blade or arm G has an inclined position, as shown in Fig. 1, and is curved laterally, as shown in Fig. 2, its lower or outer end being just in contact with the bottom of the box A.

In the bottom of the box A there are made a series of rectangular openings, $c$, said openings being side by side and corresponding in and with the compartments in the molds H. The lower end of the blade or arm G passes over these openings as the shaft F rotates.

The clay, properly moistened, is thrown into the box A, and is cut or ground and tempered by means of the arms or blades $a$ of shaft F, and the tempered clay is forced through the openings $c$ into the molds underneath the box A.

I represents an adjustable open or slatted frame underneath the box A, and having a series of rollers, $d$, in its back part, on which the molds H rest when underneath the openings $c$ to receive the clay from the box A.

J represents a reciprocating frame or carriage, in the sides of which rollers $e$ are fitted horizontally and work in guides K. This frame or carriage J has a weight, L, connected to its rear end by a cord or chain, $f$, and the cam C, at the lower end of the shaft F, works against a friction-roller, M, in the frame or carriage J, and throws the latter forward during each revolution of the shaft F, the weight L bringing the frame or carriage back each time after the cam has passed the friction-roller.

The frame or carriage has two arms, $g\,g$, attached to it, which are parallel with each other and work over the top of the frame I, said arms being connected by a bar, $h$, which act upon the mold.

Each time the frame or carriage J is drawn back by the weight L the operator or attendant places an empty mold, H, on the rollers $d$ of the frame I, and the pressure blade or arm G, each time after the frame or carriage J has been drawn back, passes over the openings $c$ and forces the clay down into the mold H underneath, and each time after said blade or arm has passed over the openings $c$ the cam C strikes the roller M, and the frame or carriage J is moved forward, and the filled mold shoved forward from underneath the openings $c$, the weight L drawing the frame or carriage J immediately back as the cam C leaves or passes the roller M, and sufficient time elapses to admit of the operator placing an empty mold on the rollers $d$ before the blade or arm G commences to pass over the openings $c$. By this means the operator is enabled to feed the empty molds to the press as fast as they can be filled and discharged therefrom.

The blade or arm G, in consequence of being elastic, is allowed to yield to any hard foreign substances—such as stones, sticks, &c.—and thereby prevented from being broken.

I would remark that the inner end of the frame I is hung on pivots or journals $i\ i$, and the front end rests on eccentrics $j\ j$ on a shaft, N. By turning the latter the frame I may be adjusted so as to bring the tops of the molds as close to the bottom of the box A as may be desired. I would further remark that the friction-rollers $e$ admit of the free movement of the frame or carriage J, and enable the weight L to draw it back with certainty each time the cam C leaves or passes the friction-roller M.

I claim as new and desire to secure by Letters Patent—

1. The elastic or yielding blade or arm G, attached to the rotary shaft F, substantially as and for the purpose herein set forth.

2. The frame or carriage J, operated by the cam C on the shaft F, and the weight L, attached to the frame or carriage, substantially as and for the purpose specified.

3. The friction-rollers $e$, applied to the frame or carriage J and fitted in guides K, substantially as and for the purpose set forth.

JOHN GEORGE.

Witnesses:
JAS. A. DYER,
J. H. PETERSON.